(12) United States Patent
Luo et al.

(10) Patent No.: US 11,052,504 B1
(45) Date of Patent: Jul. 6, 2021

(54) TEMPERATURE REGULATION SYSTEM AND TEMPERATURE REGULATION METHOD FOR MACHINE TOOL

(71) Applicant: INDUSTRIAL TECHNOLOGY RESEARCH INSTITUTE, Hsinchu (TW)

(72) Inventors: Shi-Jie Luo, Hsinchu (TW); Hsi-Hung Hsiao, Hsinchu (TW); Kun-Ying Li, Hsinchu (TW); Shih-Jie Wei, Hsinchu (TW); Yan-Sin Liao, Hsinchu (TW); Szu-Chia Lin, Hsinchu (TW); Yu-Hsuan Wu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/785,696

(22) Filed: Feb. 10, 2020

(51) Int. Cl.
*B23Q 11/14* (2006.01)
*G05B 15/02* (2006.01)
*B23Q 11/00* (2006.01)

(52) U.S. Cl.
CPC ........ *B23Q 11/141* (2013.01); *B23Q 11/0003* (2013.01); *G05B 15/02* (2013.01)

(58) Field of Classification Search
CPC .... B23Q 11/141; B23Q 11/0003; G05B 15/02
USPC ........................................................ 700/282
See application file for complete search history.

(56) References Cited

U.S. PATENT DOCUMENTS

| 5,040,379 | A | 8/1991 | Fukunaga et al. |
| 6,089,797 | A | 7/2000 | Chen et al. |
| 2015/0290758 | A1 | 10/2015 | Liang |
| 2019/0047104 | A1* | 2/2019 | Liao ..................... B23Q 11/141 |

FOREIGN PATENT DOCUMENTS

| CN | 2587583 | 11/2003 |
| CN | 102313211 | 1/2012 |
| CN | 207953368 | 10/2018 |

(Continued)

OTHER PUBLICATIONS

Taiwanese Office Action for Taiwanese Patent Application No. 109104111 dated Oct. 30, 2020.

(Continued)

*Primary Examiner* — Kenneth M Lo
*Assistant Examiner* — Michael W Choi
(74) *Attorney, Agent, or Firm* — Amin, Turocy & Watson LLP

(57) ABSTRACT

A temperature regulation system and a temperature regulation method are applicable to a machine tool. The temperature regulation system includes a cooling fluid storage tank, a heating fluid storage tank, an internal circulation subsystem, an external circulation subsystem and a computing unit. The internal circulation subsystem includes a first valve. The external circulation subsystem includes a plurality of flow channels and a second valve and a third valve disposed on the plurality of flow channels. The computing unit controls the first valve, the second valve and the third valve to switch flow directions of the plurality of the flow channels among the cooling fluid storage tank, the heating fluid storage tank and machine tool. Therefore, a thermal balance of the machine tool can be effectively maintained.

24 Claims, 8 Drawing Sheets

(56) References Cited

FOREIGN PATENT DOCUMENTS

| | | | | |
|---|---|---|---|---|
| CN | 109373547 | | 2/2019 | |
| EP | 1927431 | | 6/2008 | |
| EP | 3553422 | | 10/2019 | |
| JP | 4-372328 | | 12/1992 | |
| JP | 5048999 | | 10/2012 | |
| JP | 2020003083 | A * | 1/2020 | .............. Y02P 70/10 |
| KR | 101936425 | B1 * | 1/2019 | ....... H01L 21/67098 |
| TW | I508814 | | 11/2015 | |
| TW | 201716730 | | 5/2017 | |
| TW | M578203 | | 5/2019 | |

OTHER PUBLICATIONS

Bryan, "International status of thermal error research(1990)", CIRP Annals—Manufacturing Technology 1990, 39, 645-656.

Tanabe, et al. "Dual Cooling Jacket around Spindle Bearings with Feed-Forward Temperature Control System to Decrease Thermal Deformation", JSME international journal. Ser. C, Dynamics, control, robotics, design and manufacturing, 1996, p. 149-155.

Mayr, et al. "Thermal issues in machine tools", CIRP Annals—Manufacturing Technology 2012, 61, 771-791.

Holman, "Heat transfer", McGraw-Hill, 1989.

"Multiple physical coupling analysis of machine tool structure", 2016.

"Introduction to Machine Tool Adaptive Thermal Balance Technology", 2017.

* cited by examiner

TEMPERATURE REGULATION SYSTEM AND TEMPERATURE REGULATION METHOD FOR MACHINE TOOL

BACKGROUND

1. Technical Field

The present disclosure relates to temperature regulation systems and temperature regulation methods, and, more particularly, to a temperature regulation system and a temperature regulation method that can heat and cool a machine tool.

2. Description of Related Art

A conventional working machine tool will be thermally deformed due to the heat generated by its driving components, the heat generated during cutting, or even the temperature of the working environment, and thus have reduced precision. The thermal deformation accounts for 70% of overall errors. Therefore, the conventional machine tool is equipped with a cooling machine to cool the driving components or the machine tool itself.

However, the conventional cooling machine is generally equipped with only one fluid storage tank to perform cooling cycle of a fluid, and a heating rod is used to compensate the precision of the output temperature. Therefore, the conventional machine tool cannot be cooled or heated in time. Moreover, the conventional machine tool is compensated thermally based on experiment results of linear regression, which, however, cannot predict a non-linear structure effectively, such as an asymmetrical primary axis head structure. As a result, the conventional machine tool suffers a poor thermal balance and has reduced precision.

Therefore, how to provide a temperature regulation system and a temperature regulation method that can solve the problems of the prior art is becoming an urgent issue in the art.

SUMMARY

In an embodiment, a temperature regulation system according to the present disclosure is applicable to a machine tool and comprises: a cooling fluid storage tank, in which a heat exchanger is disposed; a heating fluid storage tank, in which a heat exchanger is disposed; an internal circulation subsystem, comprising: a compressor; a condenser; an expansion valve; and a first valve configured for switching the compressor, such that coolant compressed by the compressor flows to the heat exchanger in the heating fluid storage tank, or flows through the condenser and the expansion valve sequentially to the heat exchanger in the cooling fluid storage tank; an external circulation subsystem, comprising: at least one cooling flow channel connected through the cooling fluid storage tank to a first portion of the machine tool; at least one heating flow channel connected through the heating fluid storage tank to a second portion of the machine tool; a first returning flow channel connected through the first portion to the cooling fluid storage tank; a second returning flow channel connected through the second portion to the heating fluid storage tank; at least one second valve disposed on the cooling flow channel and the heating flow channel and configured for switching a flow direction between the cooling flow channel and the first portion and a flow direction between the heating flow channel and the second portion; and a third valve disposed on the first and second returning flow channels and configured for switching a flow direction between the first returning flow channel and the cooling fluid storage tank and a flow direction between the second returning flow channel and the heating fluid storage tank; and a computing unit configured for controlling the first valve, the second valve and the third valve.

In another embodiment, a temperature regulation method according to the present disclosure is applicable to a machine tool and comprises: disposing a temperature regulation system in the machine tool, the temperature regulation system comprising: a cooling fluid storage tank; a heating fluid storage tank; an internal circulation subsystem comprising: a compressor; a condenser; an expansion valve; and a first valve; an external circulation subsystem comprising: at least one cooling flow channel connected through the cooling fluid storage tank to a first portion of the machine tool; at least one heating flow channel connected through the heating fluid storage tank to a second portion of the machine tool; a first returning flow channel connected from the first portion to the cooling fluid storage tank; a second returning flow channel connected from the second portion to the heating fluid storage tank; a second valve disposed on the cooling flow channel and the heating flow channel; and a third valve disposed on the first and second returning flow channels; and a computing unit; determining a temperature state of the internal circulation subsystem, to enable the computing unit to control the first valve to switch a coolant compressed by the compressor to flow to the heating fluid storage tank, or to flow through the condenser and the expansion valve sequentially to the cooling fluid storage tank; and determining a temperature state of the external circulation subsystem, to enable the computing unit to control the second valve to switch a flow direction between the cooling flow channel and the first portion and a flow direction between the heating flow channel and the second portion, and to control the third valve to switch a flow direction between the first returning flow channel and the cooling fluid storage tank and a flow direction between the second returning flow channel and the heating fluid storage tank.

In the temperature regulation system and the temperature regulation method according to the present disclosure, the cooling fluid storage tank and the heating fluid storage tank provide a high temperature response function, and the computing unit controls the first valve, the second valve and the third valve to switch flow directions of a plurality of the flow channels among the cooling fluid storage tank, the heating fluid storage tank and the machine tool. Therefore, a thermal balance of the machine tool is maintained, the thermal deformation of a nonlinear structure is reduced or eliminated, and the thermal compensation precision and accuracy are improved.

DETAILED DESCRIPTION

Figure 1:
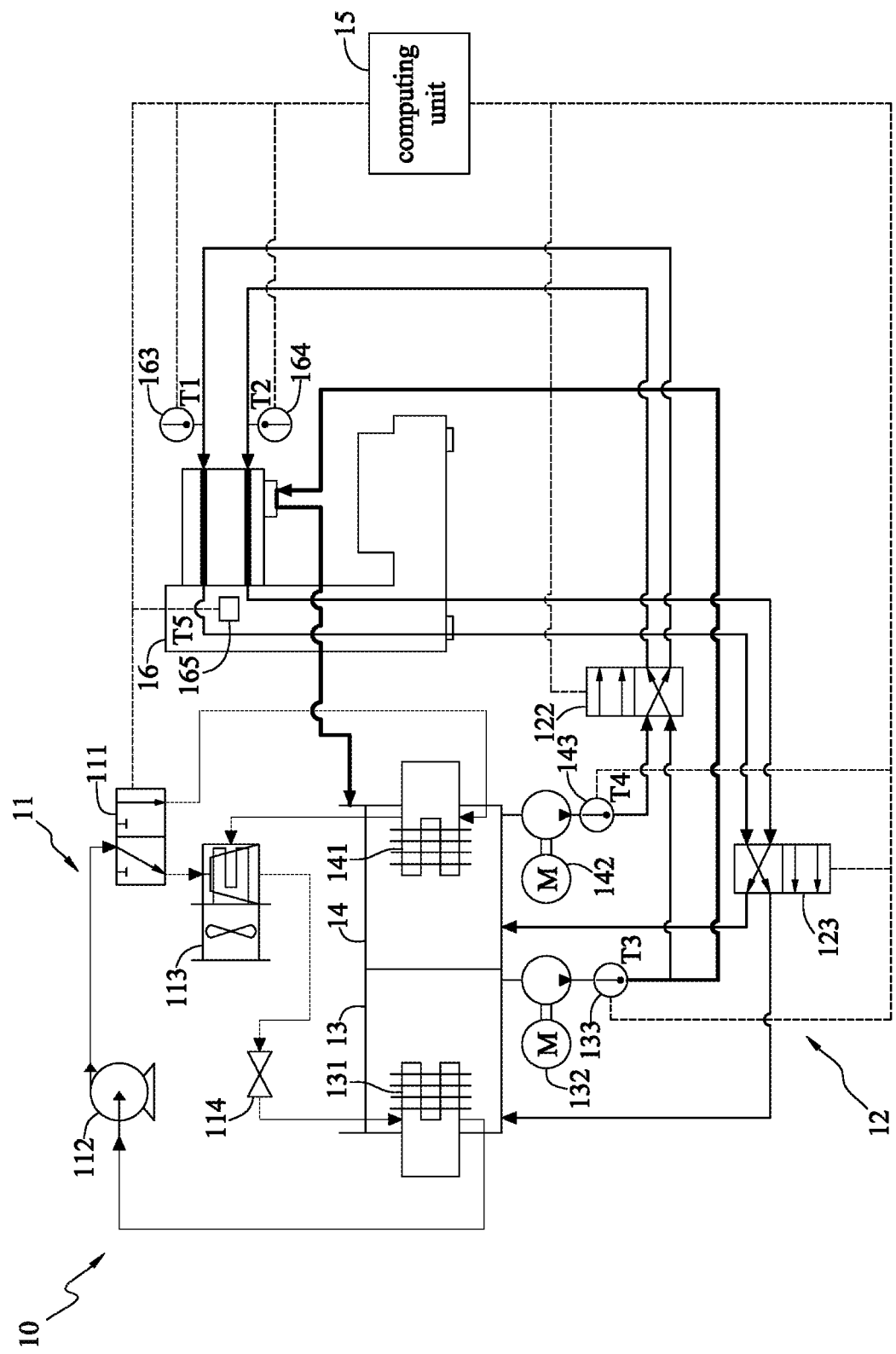
FIG. 1 schematically illustrates a temperature regulation system according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 schematically illustrates a temperature regulation system 10 according to the present disclosure. The temperature regulation system 10 is applied in a machine tool 16. The temperature regulation system 10 comprises a cooling fluid storage tank 13, a heating fluid storage tank 14, an internal circulation subsystem 11 (detailed in FIGS. 2A and 2B), an external circulation subsystem 12 (detailed in FIGS. 3A to 3D), and a computing unit 15. In the cooling fluid storage tank 13, a fluid (e.g., oil) is stored and a heat exchanger 131 is disposed. In the heating fluid storage tank 14, a fluid (e.g., oil) is stored and a heat exchanger 141 is disposed.

Figure 2A:
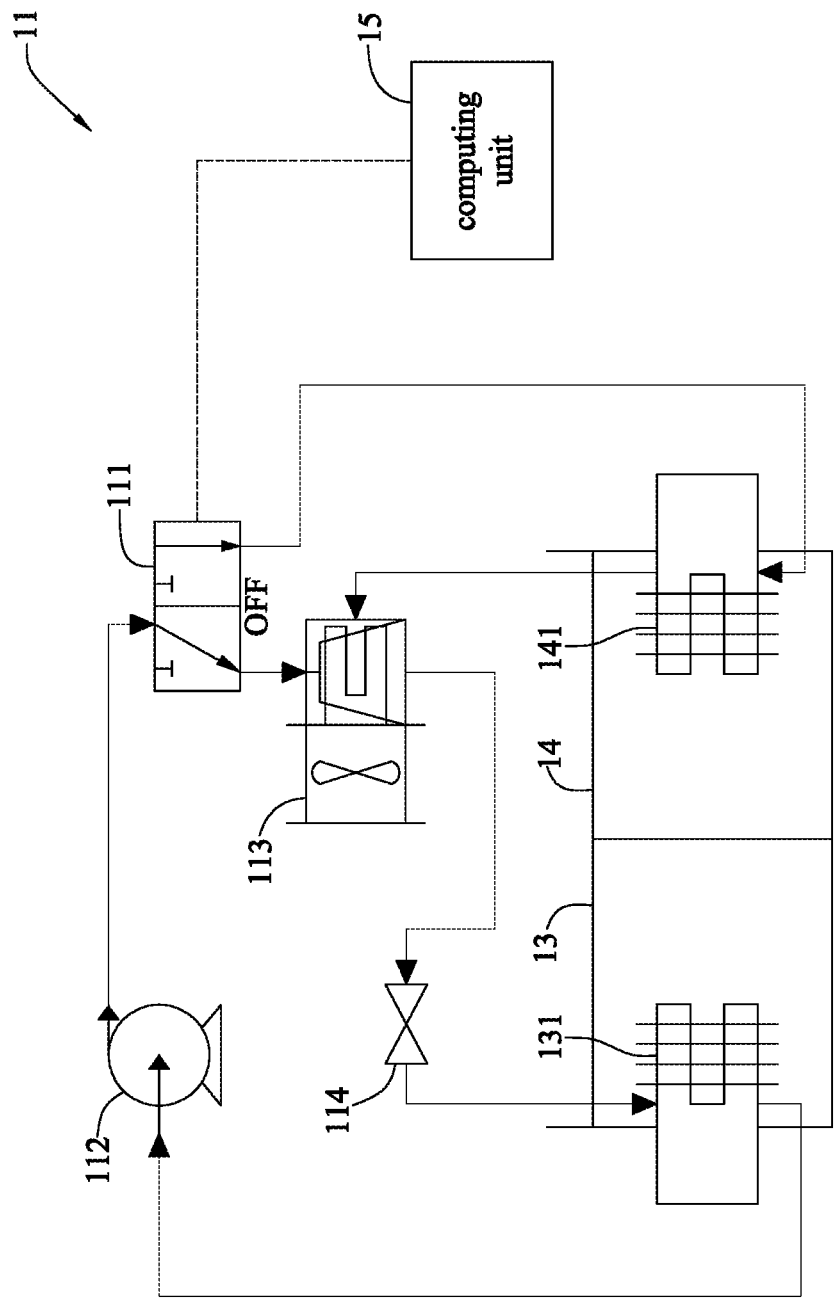
FIGS. 2A and 2B schematically illustrates the operation of an internal circulation subsystem of a temperature regulation system according to the present disclosure.
Figure 2B:
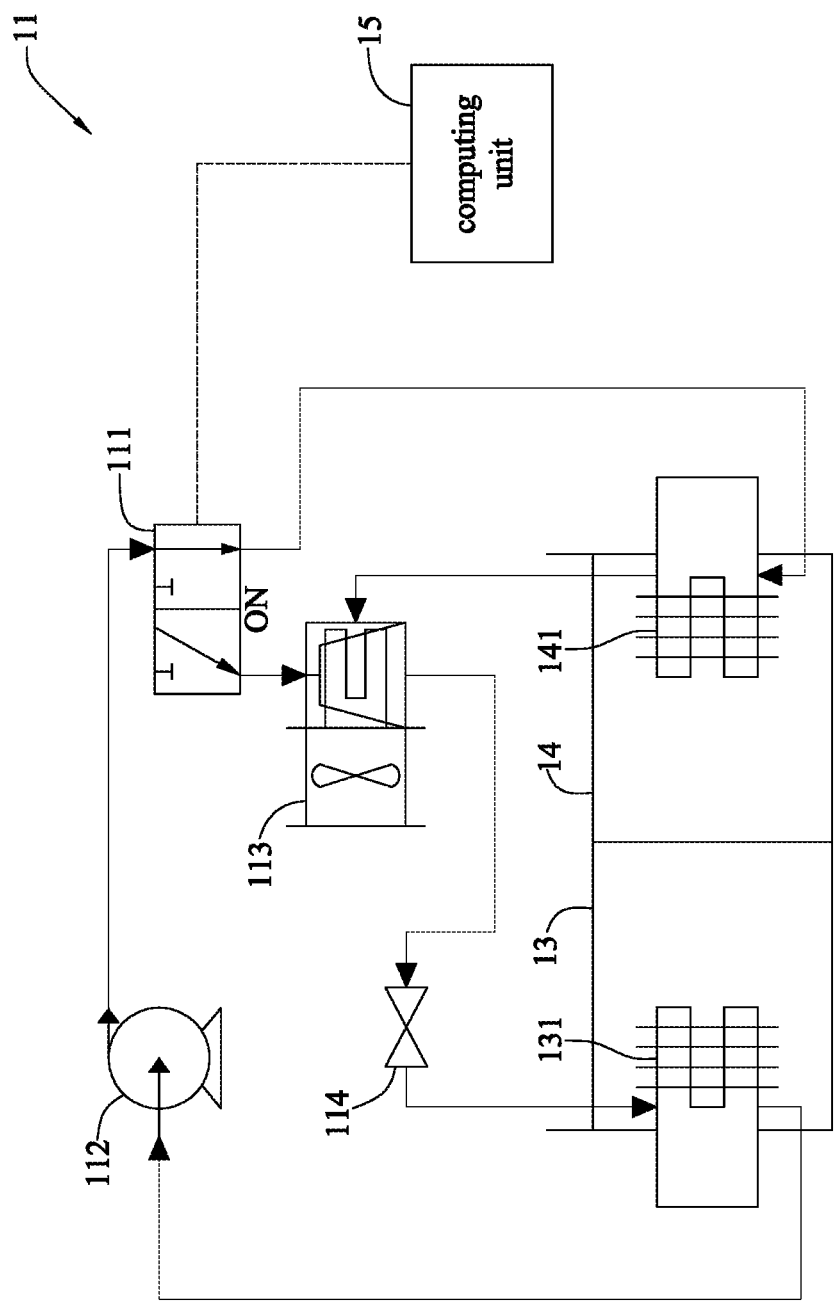

Please refer to FIGS. 1, 2A and 2B. The internal circulation subsystem 11 comprises a compressor 112, a condenser 113, an expansion valve 114 and a first valve 111. The first valve 111 switches the coolant compressed by the compressor 112 (e.g., high-temperature high-pressure coolant generated by the compressor 112) to flow to the heat exchanger 141 in the heating fluid storage tank 14 to heat the fluid (as shown in FIG. 2B), or to flow through the condenser 113 and the expansion valve 114 to the heat exchanger 131 in the cooling fluid storage tank 13 to cool the fluid (as shown in FIG. 2A). In an embodiment, the computing unit 15 controls the first valve 111 under certain conditions, which will be described in the following paragraphs.

In an embodiment, the first valve 111 is an electromagnetic valve, such as a two-position three way electromagnetic valve. As the first valve 111 is a two-position three way electromagnetic valve, the coolant compressed by the compressor 112 can flow through one of the heating fluid storage tank 14 and the cooling fluid storage tank 13 during a period of time. As shown in FIG. 2A, when the first valve 111 (e.g., in an OFF state) controls the coolant compressed by the compressor 112 to flow to the cooling fluid storage tank 13, the coolant will flow through the condenser 113 to be cooled, and the cooled coolant will then flow through the expansion valve 114 to the heat exchanger 131 in the cooling fluid storage tank 13 to cool the fluid in the cooling fluid storage tank 13. Then, the coolant will return to the compressor 112, and a cooling cycle is completed. As shown in FIG. 2B, when the first valve 111 (e.g., in an ON state) controls the coolant compressed by the compressor 112 to flow to the heat exchanger 141 in the heating fluid storage tank 14 to heat the fluid in the heating fluid storage tank 14, a heating cycle is completed. The heated coolant will flow to the condenser 113, and the cooling cycle is performed on the heated coolant.

In the internal circulation subsystem 11 of the temperature regulation system 10 according to the present disclosure, the first valve 111 controls a circulation direction of the coolant generated by the compressor 112 between the cooling fluid storage tank 13 and the heating fluid storage tank 14, to provide a heating function of the heating fluid storage tank 14 effectively.

Figure 3A:
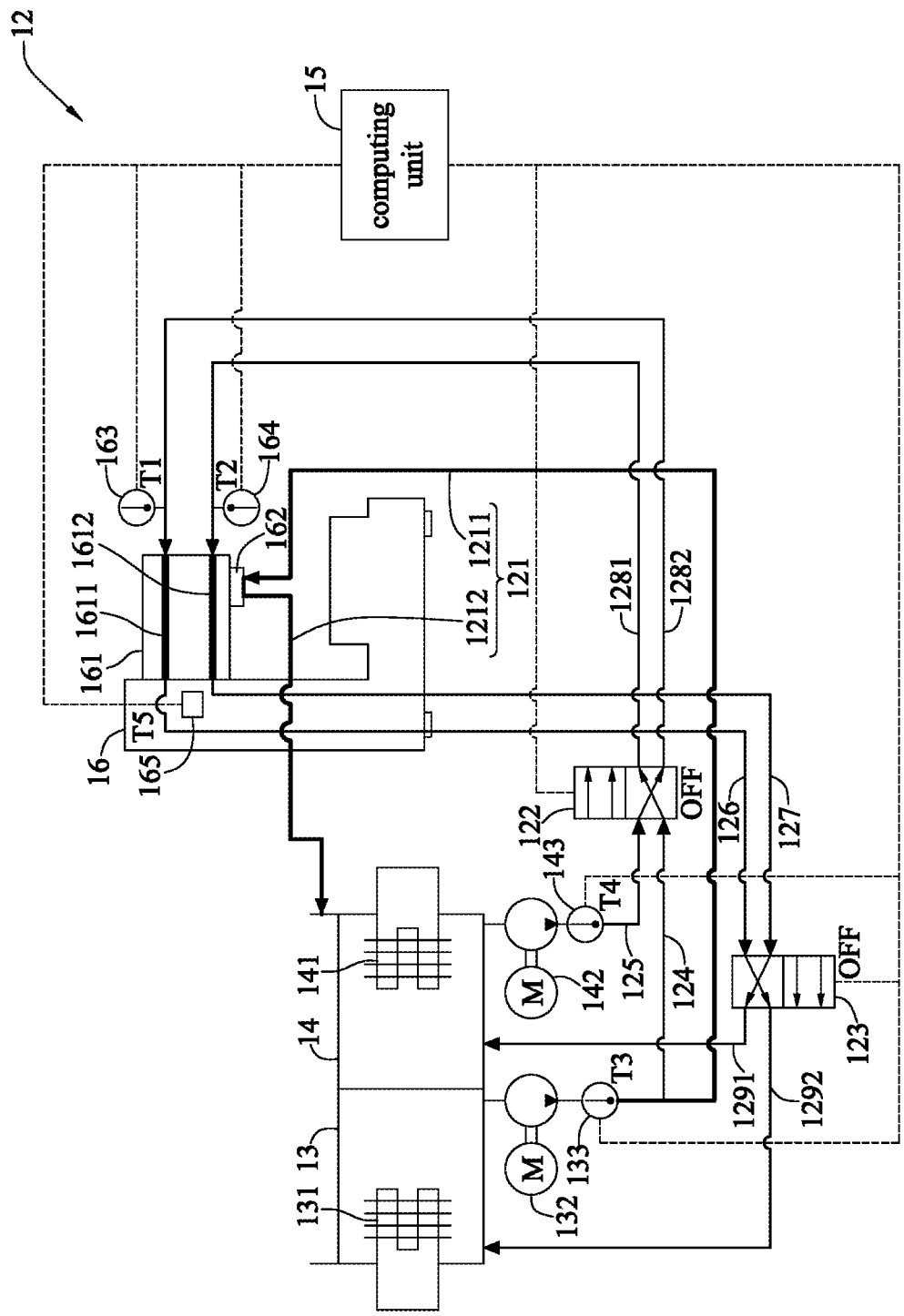
FIGS. 3A to 3D schematically illustrates the operation of an external circulation subsystem of a temperature regulation system according to the present disclosure.
Figure 3B:
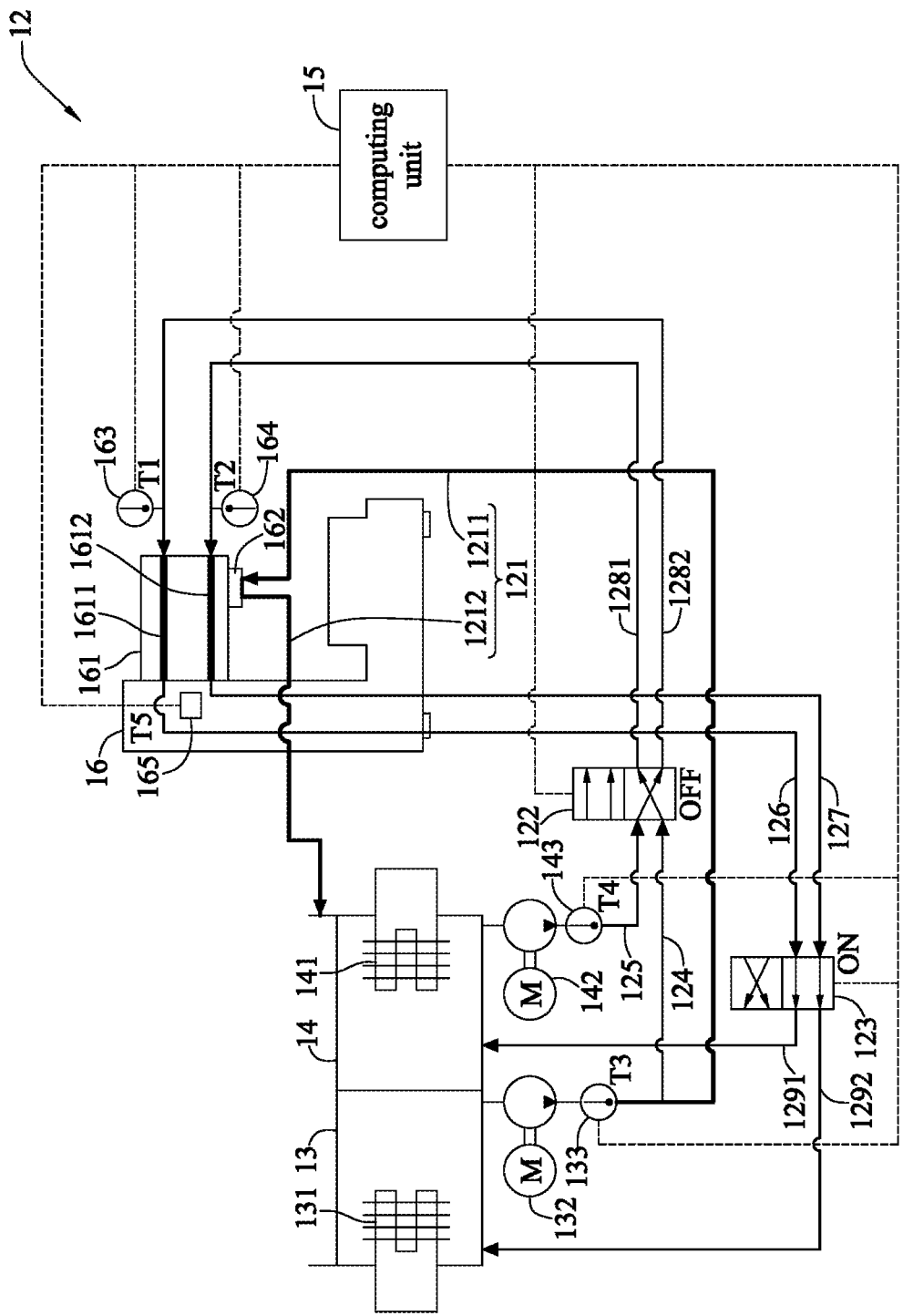
Figure 3C:
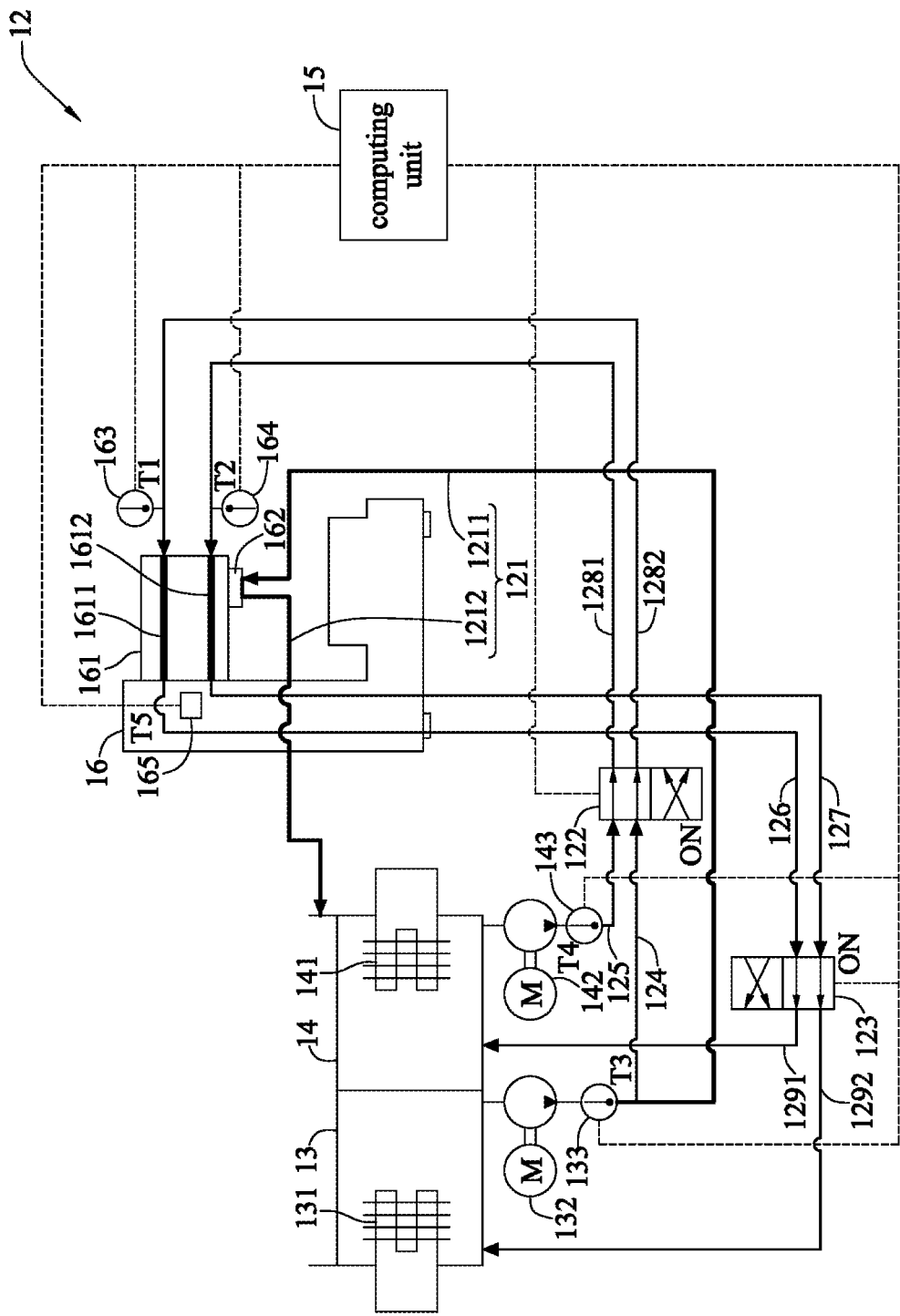
Figure 3D:
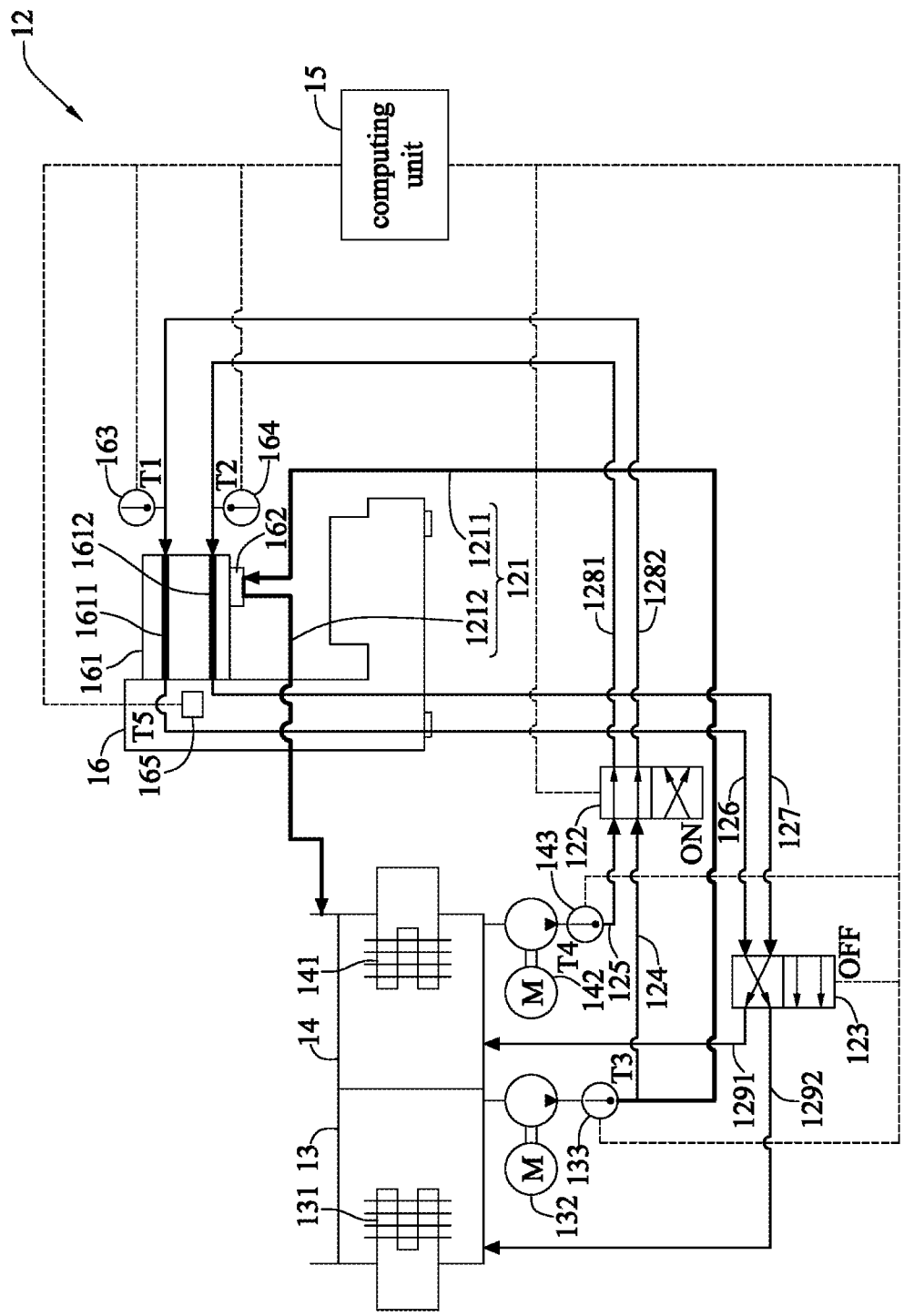

Please refer to FIGS. 1, 3A and 3D. The external circulation subsystem 12 comprises at least one cooling flow channel 124, at least one heating flow channel 125, a first returning flow channel 126, a second returning flow channel 127, at least one second valve 122 and a third valve 123. The cooling flow channel 124 is connected through the cooling fluid storage tank 13 to a first portion 1611 of a primary axis head structure 161 of the machine tool 16. The heating flow channel 125 is connected through the heating fluid storage tank 14 to a second portion 1612 of the primary axis head structure 161 of the machine tool 16. The first returning flow channel 126 is connected through the first portion 1611 to the cooling fluid storage tank 13. The second returning flow channel 127 is connected through the second portion 1612 to the heating fluid storage tank 14. The second valve 122 is disposed on the cooling flow channel 124 and the heating flow channel 125, and switches a flow direction between the cooling flow channel 124 and the first portion 1611 and a flow direction between the heating flow channel 125 and the second portion 1612. The third valve 123 is disposed on the first and second returning flow channels 126 and 127, and switches a flow direction between the first returning flow channel 126 and the cooling fluid storage tank 13 and a flow direction between the second returning flow channel 127 and the heating fluid storage tank 14. In an embodiment, the computing unit 15 controls the second valve 122 and the third valve 123 under certain conditions, which will be described in the following paragraphs.

In an embodiment, the second valve 122 and the third valve 123 are an electromagnetic valve, such as a two-position four way electromagnetic valve. As the second valve 122 and the third valve 123 are a two-position four way electromagnetic valve, the ways that the cooling flow channel 124 is connected to the first portion 1611, the heating flow channel 125 is connected to the second portion 1612, the first returning flow channel 126 is connected to the cooling fluid storage tank 13, and the second returning flow channel 127 is connected to the heating fluid storage tank 14 will vary according to the states (e.g., ON or OFF state) of the second valve 122 and the third valve 123.

As shown in FIGS. 3A and 3B, when the second valve 122 is in the OFF state, the cooling flow channel 124 connected to the cooling circulation pump 132 of the cooling fluid storage tank 13 is connected through a flow channel 1281 to the second portion 1612 of the primary axis head structure 161 of the machine tool 16, and the heating flow channel 125 connected to the heating circulation pump 142 of the heating fluid storage tank 14 is connected through a flow channel 1282 to the first portion 1611 of the primary axis head structure 161 of the machine tool 16.

As shown in FIGS. 3C and 3D, when the second valve 122 is in the ON state, the cooling flow channel 124 is connected through the flow channel 1282 to the first portion 1611 of the primary axis head structure 161 of the machine tool 16, and the heating flow channel 125 is connected through the flow channel 1281 to the second portion 1612 of the primary axis head structure 161 of the machine tool 16.

As shown in FIGS. 3A and 3D, when the third valve 123 is in the OFF state, the first returning flow channel 126 connected to the first portion 1611 of the primary axis head structure 161 of the machine tool 16 is connected through the flow channel 1292 to the cooling fluid storage tank 13, and the second returning flow channel 127 connected to the second portion 1612 of the primary axis head structure 161 of the machine tool 16 is connected through the flow channel 1291 to the heating fluid storage tank 14.

As shown in FIGS. 3B and 3C, when the third valve 123 is in the ON state, the first returning flow channel 126 connected to the first portion 1611 of the primary axis head structure 161 of the machine tool 16 is connected through the flow channel 1291 to the heating fluid storage tank 14, and the second returning flow channel 127 connected to the second portion 1612 of the primary axis head structure 161 of the machine tool 16 is connected through the flow channel 1292 to the cooling fluid storage tank 13.

In an embodiment, a first output temperature measuring unit 133 is disposed at where the cooling circulation pump 132 of the cooling fluid storage tank 13 is connected to the cooling flow channel 124, and measures a temperature T3 of fluid flowing out from the cooling fluid storage tank 13. A second output temperature measuring unit 143 is disposed at where the heating circulation pump 142 of the heating fluid storage tank 14 is connected to the heating flow channel 125, and measures a temperature T4 of fluid flowing out from the heating fluid storage tank 14.

In an embodiment, a first structure temperature measuring unit 163 is disposed on the first portion 1611 of the primary axis head structure 161 of the machine tool 16, and measures a temperature T1 of the first portion 1611. A second structure temperature measuring unit 164 is disposed on the second portion 1612 of the primary axis head structure 161 of the machine tool 16, and measures a temperature T2 of the second portion 1612. A machine body temperature measuring unit 165 is disposed on the machine tool 16, and measures a temperature T5 of the machine tool 16.

In an embodiment, the first output temperature measuring unit 133, the second output temperature measuring unit 143, the first structure temperature measuring unit 163, the second structure temperature measuring unit 164 and the machine body temperature measuring unit 165 are respectively connected to the computing unit 15, and the computing unit 15 controls the first valve 111, the second valve 122 and the third valve 123 based on temperatures fed back from the first output temperature measuring unit 133, the second output temperature measuring unit 143, the first structure temperature measuring unit 163, the second structure temperature measuring unit 164 and the machine body temperature measuring unit 165.

In an embodiment, as shown in FIGS. 3A to 3D, the temperature regulation system 10 further comprises a primary axis cooling circulation subsystem 121. The primary axis cooling circulation subsystem 121 comprises a primary axis cooling flow channel 1211 and a primary axis cooling returning flow channel 1212. The primary axis cooling flow channel 1211 is connected from the cooling circulation pump 132 of the cooling fluid storage tank 13 to the primary axis 162 of the machine tool 16. The primary axis cooling returning flow channel 1212 is connected from the primary axis 162 to the heating fluid storage tank 14. In an embodiment, no valve is disposed in the primary axis cooling circulation subsystem 121, and fluid in the cooling fluid storage tank 13 can cool the primary axis 162 via the primary axis cooling flow channel 1211 continuously, maintaining the cooling function of the primary axis 162 and reducing a linear thermal deformation. In an embodiment, a valve is disposed on the primary axis cooling flow channel 1211.

In an embodiment, the computing unit 15 is a computer stored with a software program executable by a processor, or is a programmable logic controller (PLC) stored with recordable program codes. In an embodiment, the computing unit 15 is a computer, and the software program stored in the computer is used for receiving the temperatures fed back from the first output temperature measuring unit 133, the second output temperature measuring unit 143, the first structure temperature measuring unit 163, the second structure temperature measuring unit 164 and the machine body temperature measuring unit 165 to control the first valve 111, the second valve 122 and the third valve 123 to be in the ON state or the OFF state. In another embodiment, the computing unit 15 is a programmable logic controller, and program codes for controlling valves are recorded in the programmable logic controller and integrated into the machine tool 16.

Figure 4:
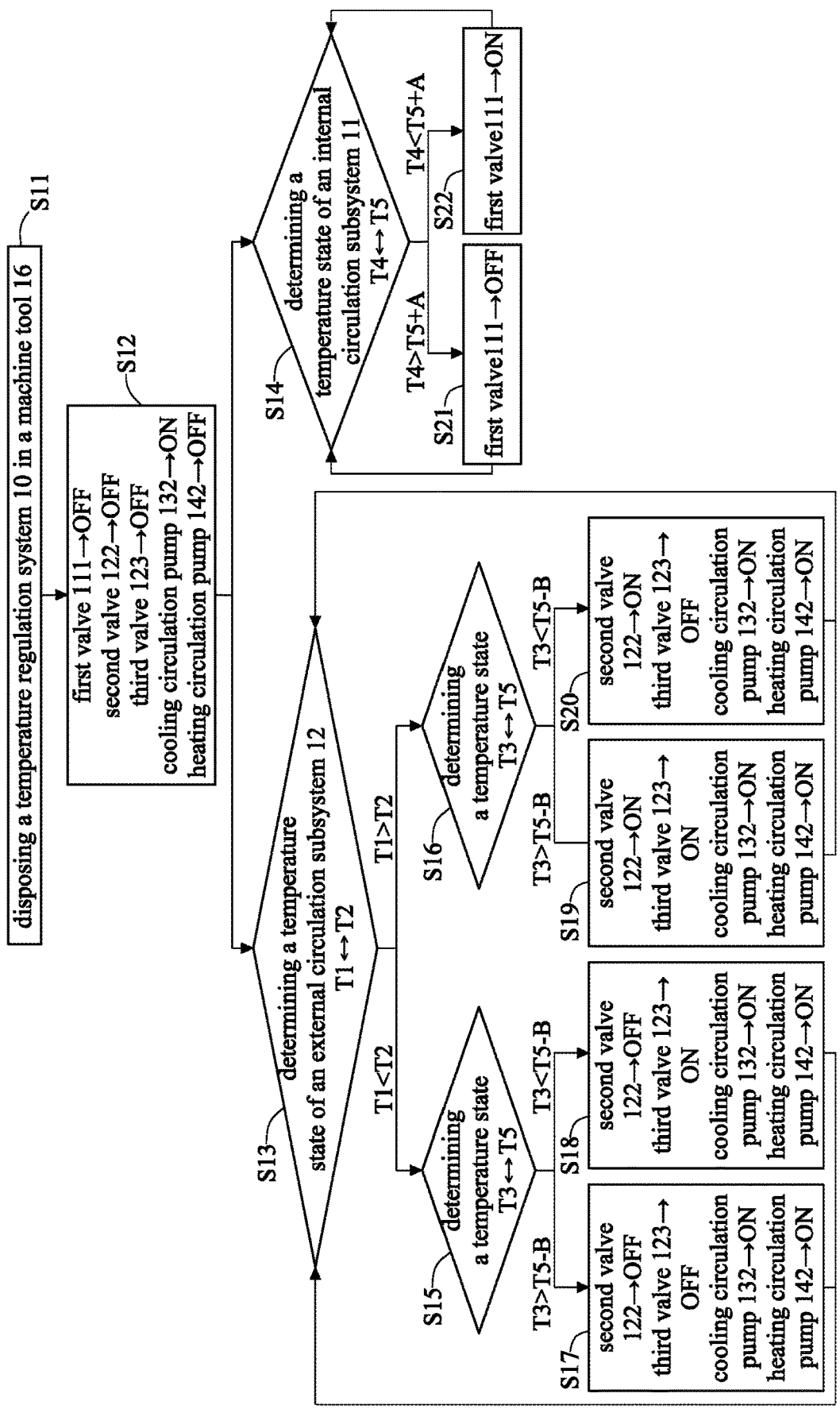
FIG. 4 is a flow chart of a temperature regulation method according to the present disclosure.

FIG. 4 is a flow chart of a temperature regulation method according to the present disclosure. In an embodiment, the first valve 111, the second valve 122 and the third valve 123 are controlled under certain conditions that are set based on a thermal balance database established according to a great number of experiment data.

In step S11, the temperature regulation method is implemented by disposing a temperature regulation system 10 in a machine tool 16. In step S12, the states of the first valve 111, the second valve 122, the third valve 123, the cooling circulation pump 132 and the heating circulation pump 142 are initialized. In an embodiment, the first valve 111, the second valve 122, the third valve 123 and the heating circulation pump 142 are set to be in the OFF state initially, and the cooling circulation pump 132 is set to be in the ON state initially.

The computing unit 15 determines a temperature state of the internal circulation subsystem 11 (step S14) and a temperature state of the external circulation subsystem 12 (step S13) based on the temperatures fed back from the first output temperature measuring unit 133, the second output temperature measuring unit 143, the first structure temperature measuring unit 163, the second structure temperature measuring unit 164 and the machine body temperature measuring unit 165. In an embodiment, step S13 can be executed before or after step S14. In another embodiment, steps S13 and S14 are executed at the same time.

In step S14, the computing unit 15 receives the temperature T5 measured by the machine body temperature measuring unit 165 and the temperature T4 measured by the second output temperature measuring unit 143, to control the ON/OFF state of the first valve 111. In an embodiment, the computing unit 15 compares the temperature T5 added by a first variable A with the temperature T4.

In an embodiment, when the temperature T5 added by the first variable A is less than the temperature T4, the method proceeds to step S21, as shown in FIG. 2A, the computing unit 15 switches the first valve 111 to be in the OFF state, and the coolant compressed by the compressor 112 will flow through the condenser 113 and the expansion valve 114 sequentially to the heat exchanger 131 in the cooling fluid storage tank 13 to cool the fluid in the cooling fluid storage tank 13. The coolant generated by the compressor 112 will not flow into the heating fluid storage tank 14.

In another embodiment, when the temperature T5 added by the first variable A is greater than the temperature T4, the method proceeds to step S22, as shown in FIG. 2B, the computing unit 15 switches the first valve 111 to be in the ON state, and the coolant compressed by the compressor 112 will flow to the heat exchanger 141 in the heating fluid storage tank 14 to heat the fluid in the heating fluid storage tank 14. Then, the coolant will flow through the condenser 113 to be cooled, and the cooled coolant will flow through the expansion valve 114 to the heat exchanger 131 in the cooling fluid storage tank 13 to cool the fluid in the cooling fluid storage tank 13. Then, the coolant will return to the compressor 112.

The first variable A is a temperature parameter set based on characteristics of a machine. In an embodiment, the first variable A is within 1-3 degrees. In an embodiment, a delay period of time, such as 30 to 300 seconds, is defined based on characteristics of a machine, and after steps S21 and S22 are executed, the computing unit 15 does not return to step S14 until the delay period of time is elapsed.

In step S13, the computing unit 15 receives the temperature T1 measured by the first structure temperature measuring unit 163 and the temperature T2 measured by the second structure temperature measuring unit 164, and controls the ON/OFF state of the second valve 122. In an embodiment, the computing unit 15 compares the temperature T1 with the temperature T2.

In an embodiment, when the temperature T1 is less than the temperature T2, the method proceeds to steps S15, S17 and S18, the computing unit 15 switches the second valve 122 to be in the OFF state (as shown in FIGS. 3A and 3B), the cooling flow channel 124 is connected through the flow channel 1281 to the second portion 1612 of the primary axis head structure 161 of the machine tool 16, and the heating flow channel 125 is connected through the flow channel 1282 to the first portion 1611 of the primary axis head structure 161 of the machine tool 16. In an embodiment, in step S15, the computing unit 15 receives the temperature T5 measured by the machine body temperature measuring unit 165 and the temperature T3 measured by the first output temperature measuring unit 133 at the same time, compares the temperature T5 with the temperature T3, and controls the ON/OFF state of the third valve 123 when the second valve 122 is switched to be in the OFF state.

In an embodiment, when the temperature T5 is compared with the temperature T3, a second variable B can be added for micro adjustment. In an embodiment, when the temperature T5 deducted by the second variable B is less than the temperature T3, the method proceeds to step S17, as shown in FIG. 3A, the computing unit 15 switches the third valve 123 to be in the OFF state, the first returning flow channel 126 flows from the first portion 1611 through the flow channel 1292 to the cooling fluid storage tank 13, and the second returning flow channel 127 flows from the second portion 1612 through the flow channel 1291 to the heating fluid storage tank 14. In another embodiment, when the temperature T5 deducted by the second variable B is greater than the temperature T3, the method proceeds to step S18, as shown in FIG. 3B, the computing unit 15 switches the third valve 123 to be in the ON state, the first returning flow channel 126 flows from the first portion 1611 through the flow channel 1291 to the heating fluid storage tank 14, and the second returning flow channel 127 flows from the second portion 1612 through the flow channel 1292 to the cooling fluid storage tank 13.

In another embodiment, when the temperature T1 is greater than the temperature T2, the method proceeds to steps S16, S19 and S20, the computing unit 15 switches the second valve 122 to be in the ON state (as shown in FIGS. 3C and 3D), the cooling flow channel 124 is connected through the flow channel 1282 to the first portion 1611 of the primary axis head structure 161 of the machine tool 16, and the heating flow channel 125 is connected through the flow channel 1281 to the second portion 1612 of the primary axis head structure 161 of the machine tool 16. In an embodiment, in step S16, the computing unit 15 receives the temperature T5 measured by the machine body temperature measuring unit 165 and the temperature T3 measured by the first output temperature measuring unit 133 at the same time, compares the temperature T5 with the temperature T3, and controls the ON/OFF state of the third valve 123 when the second valve 122 is switched to be in the ON state.

In an embodiment, when the temperature T5 and the temperature T3 are compared, a second variable B can be added for micro adjustment. In an embodiment, when the temperature T5 deducted by the second variable B is less than the temperature T3, the method proceeds to step S19, as shown in FIG. 3C, the computing unit 15 switches the third valve 123 to be in the ON state, the first returning flow channel 126 flows from the first portion 1611 through the flow channel 1291 to the heating fluid storage tank 14, and the second returning flow channel 127 flows from the second portion 1612 through the flow channel 1292 to the cooling fluid storage tank 13. In another embodiment, when the temperature T5 deducted by the second variable B is greater than the temperature T3, the method proceeds to step S20, as shown in FIG. 3D, the computing unit 15 switches the third valve 123 to be in the OFF state, the first returning flow channel 126 flows from the first portion 1611 through the flow channel 1292 to the cooling fluid storage tank 13, and the second returning flow channel 127 flows from the second portion 1612 through the flow channel 1291 to the heating fluid storage tank 14.

The second variable B is a temperature parameter set based on characteristics of a machine. In an embodiment, the second variable B is within 1-3 degrees. In an embodiment, a delay period of time, such as 60 to 600 seconds, is defined based on characteristics of a machine, and after steps S17, S18, S19 and S20 are executed, the computing unit 15 does not return to step S13 until the delay period of time is elapsed.

In the temperature regulation system and the temperature regulation method according to the present disclosure, when the temperatures of the first portion 1611 and the second portion 1612 of the primary axis head structure 161 of the machine tool 16 are not even (e.g., the temperature T1 being greater or less than the temperature T2), the computing unit 15 controls the second valve 122 to switch flow directions between the cooling and heating flow channels 124 and 125 and the first and second portions 1611 and 1612, to convey the cooled fluid in the cooling fluid storage tank 13 and the heated fluid in the heating fluid storage tank 14 into the primary axis head structure 161, to maintain the thermal balance of the primary axis head structure 161, reduce or eliminate the generation of the thermal deformation of a nonlinear structure, or simultaneously reduce or eliminate the thermal deformation and linear thermal deformation of a nonlinear structure. As shown in FIG. 3A, the temperature T2 of the second portion 1612 is greater than the temperature T1 of the first portion 1611, the machine body temperature T5 is less than the temperature T3 of the fluid flowing out from the cooling fluid storage tank 13, and the second portion 1612 and the first portion 1611 have to be cooled or heated, respectively. Accordingly, the fluid flowing from the cooling fluid storage tank 13 flows through the cooling flow channel 124 and the flow channel 1281 to the second portion 1612, and the fluid flowing from the heating fluid storage tank 14 flows through the heating flow channel 125 and the flow channel 1282 to the first portion 1611, until the first portion 1611 and the second portion 1612 reach the thermal balance. After flowing out from the cooling fluid storage tank 13, the fluid used for cooling the second portion 1612 is heated up, and has to flow through the second returning flow channel 127 and the flow channel 1291 to the heating fluid storage tank 14. After flowing out from the heating fluid storage tank 14, the fluid used to heat the first portion 1611 is cooled down, and has to flow through the first returning flow channel 126 and the flow channel 1292 to the cooling fluid storage tank 13. Therefore, the temperature of the fluid in the cooling fluid storage tank 13 and the heating fluid storage tank 14 does not change abruptly, and the thermal balance can be maintained in the cooling fluid storage tank 13 and the heating fluid storage tank 14.

In an embodiment, the temperature regulation system according to the present disclosure comprises a plurality of cooling flow channels, heating flow channels and corresponding second valves, to maintain the thermal balance at different portions of a primary axis head structure of a machine tool. Accordingly, a plurality of returning flow channels and corresponding third valves can be disposed to correspond to the cooling flow channels, the heating flow channels and the corresponding second valves. In an embodiment, a returning flow channel and a corresponding third valve are provided.

In the temperature regulation system and the temperature regulation method according to the present disclosure, the cooling fluid storage tank and the heating fluid storage tank are both provided with a high temperature response. According to the present disclosure, an electromagnetic valve controls a cooling circulation direction of an internal circulation subsystem, and provides a heating function to the heating fluid storage tank. Such heating efficiency disclosed herein is 3-4 times greater than the prior art. According to the present disclosure, the primary axis cooling circulation subsystem maintains the cooling function of the primary axis effectively, and reduces the linear thermal deformation of the primary axis. According to the temperature regulation system and the temperature regulation method according to the present disclosure, the external circulation subsystem can dynamically switch the flow direction of the cooled and heated fluid based on the variation of machining conditions (e.g., temperature), to maintain the thermal balance of a primary axis head structure and reduce or eliminate the generation of the nonlinear thermal deformation. Experiment data show that in a machine tool using a conventional cooling machine, the extension in Y and Z axes are 9 um and 37 um, respectively, while in a machine tool using the temperature regulation system according to the present disclosure the extension in Y and Z axes are 5.3 um (40% of efficiency improved) and 14.5 um (60% of efficiency improved), respectively. Therefore, the present disclosure can effectively maintain the thermal balance of primary axis head structure, and reduce the nonlinear thermal deformation.

It will be apparent to those skilled in the art that various modifications and variations can be made to the disclosed embodiments. It is intended that the specification and examples be considered as exemplary only, with a true scope of the present disclosure being indicated by the following claims and their equivalents.

What is claimed is:

1. A temperature regulation system applicable to a machine tool, the temperature regulation system comprising:
   a cooling fluid storage tank, in which a heat exchanger is disposed;
   a heating fluid storage tank, in which a heat exchanger is disposed;
   an internal circulation subsystem, comprising:
     a compressor;
     a condenser;
     an expansion valve; and
     a first valve configured for switching the compressor, such that coolant compressed by the compressor flows to the heat exchanger in the heating fluid storage tank, or flows through the condenser and the expansion valve sequentially to the heat exchanger in the cooling fluid storage tank;
   an external circulation subsystem, comprising:
     at least one cooling flow channel connected through the cooling fluid storage tank to a first portion of the machine tool;
     at least one heating flow channel connected through the heating fluid storage tank to a second portion of the machine tool;
     a first returning flow channel connected through the first portion to the cooling fluid storage tank;
     a second returning flow channel connected through the second portion to the heating fluid storage tank;
     at least one second valve disposed on the cooling flow channel and the heating flow channel and configured for switching a flow direction between the cooling flow channel and the first portion and a flow direction between the heating flow channel and the second portion; and
     a third valve disposed on the first and second returning flow channels and configured for switching a flow direction between the first returning flow channel and the cooling fluid storage tank and a flow direction between and the second returning flow channel and the heating fluid storage tank; and
   a computing unit configured for controlling the first valve, the second valve and the third valve.

2. The temperature regulation system of claim 1, further comprising:
   a first output temperature measuring unit disposed at where the cooling fluid storage tank is connected to the cooling flow channel;
   a second output temperature measuring unit disposed at where the heating fluid storage tank is connected to the heating flow channel;
   a first structure temperature measuring unit disposed on the first portion;
   a second structure temperature measuring unit disposed on the second portion; and
   a machine body temperature measuring unit disposed on the machine tool,
   wherein the first output temperature measuring unit, the second output temperature measuring unit, the first structure temperature measuring unit, the second structure temperature measuring unit and the machine body temperature measuring unit are respectively connected to the computing unit.

3. The temperature regulation system of claim 2, wherein when a temperature measured by the machine body temperature measuring unit added by a first variable is greater than a temperature measured by the second output temperature measuring unit, the computing unit controls the first valve to switch the coolant to flow to the heat exchanger in the heating fluid storage tank to heat fluid in the heating fluid storage tank.

4. The temperature regulation system of claim 2, wherein when a temperature measured by the machine body temperature measuring unit added by a first variable is less than a temperature measured by the second output temperature measuring unit, the computing unit controls the first valve to switch the coolant to flow through the condenser and the expansion valve sequentially to the heat exchanger in the cooling fluid storage tank to cool fluid in the cooling fluid storage tank.

5. The temperature regulation system of claim 2, wherein when a temperature measured by the first structure temperature measuring unit is less than a temperature measured by the second structure temperature measuring unit, the computing unit controls the second valve to switch the cooling flow channel to be connected to the second portion and to switch the heating flow channel to be connected to the first portion.

6. The temperature regulation system of claim 5, wherein when a temperature measured by the machine body temperature measuring unit deducted by a second variable is less than a temperature measured by the first output temperature measuring unit, the computing unit controls the third valve to switch one of the first and second returning flow channels to flow from the first portion to the cooling fluid storage tank and to switch the other to flow from the second portion to the heating fluid storage tank.

7. The temperature regulation system of claim 5, wherein when a temperature measured by the machine body temperature measuring unit deducted by a second variable is greater than a temperature measured by the first output temperature measuring unit, the computing unit controls the third valve to switch one of the first and second returning flow channels to flow from the first portion to the heating fluid storage tank and to switch the other to flow from the second portion to the cooling fluid storage tank.

8. The temperature regulation system of claim 2, wherein when a temperature measured by the first structure temperature measuring unit is greater than a temperature measured by the second structure temperature measuring unit, the computing unit controls the second valve to switch the cooling flow channel to be connected to the first portion and to switch the heating flow channel to be connected to the second portion.

9. The temperature regulation system of claim 8, wherein when a temperature measured by the machine body temperature measuring unit deducted by a second variable is less than a temperature measured by the first output temperature measuring unit, the computing unit controls the third valve to switch one of the first and second returning flow channels to flow from the first portion to the heating fluid storage tank and to switch the other to flow from the second portion to the cooling fluid storage tank.

10. The temperature regulation system of claim 8, wherein when a temperature measured by the machine body temperature measuring unit deducted by a second variable is greater than a temperature measured by the first output temperature measuring unit, the computing unit controls the third valve to switch one of the first and second returning flow channels to flow from the first portion to the cooling fluid storage tank and to switch the other to flow from the second portion to the heating fluid storage tank.

11. The temperature regulation system of claim 1, further comprising a primary axis cooling circulation subsystem configured for cooling a primary axis of the machine tool, and comprising:
a primary axis cooling flow channel connected from the cooling fluid storage tank to the primary axis of the machine tool; and
a primary axis cooling returning flow channel connected from the primary axis to the heating fluid storage tank.

12. The temperature regulation system of claim 1, wherein the first valve, the second valve and the third valve are electromagnetic valves, and the computing unit is a computer or a programmable logic controller.

13. A temperature regulation method applicable to a machine tool, the temperature regulation method comprising:
disposing a temperature regulation system in the machine tool, the temperature regulation system comprising:
a cooling fluid storage tank;
a heating fluid storage tank;
an internal circulation subsystem comprising:
a compressor;
a condenser;
an expansion valve; and
a first valve;
an external circulation subsystem comprising:
at least one cooling flow channel connected through the cooling fluid storage tank to a first portion of the machine tool;
at least one heating flow channel connected through the heating fluid storage tank to a second portion of the machine tool;
a first returning flow channel connected from the first portion to the cooling fluid storage tank;
a second returning flow channel connected from the second portion to the heating fluid storage tank;
a second valve disposed on the cooling flow channel and the heating flow channel; and
a third valve disposed on the first and second returning flow channels; and
a computing unit;
determining a temperature state of the internal circulation subsystem, to enable the computing unit to control the first valve to switch a coolant compressed by the compressor to flow to the heating fluid storage tank, or to flow through the condenser and the expansion valve sequentially to the cooling fluid storage tank; and
determining a temperature state of the external circulation subsystem, to enable the computing unit to control the second valve to switch a flow direction between the cooling flow channel and the first portion and a flow direction between the heating flow channel and the second portion, and to control the third valve to switch a flow direction between the first returning flow channel and the cooling fluid storage tank and a flow direction between the second returning flow channel and the heating fluid storage tank.

14. The temperature regulation method of claim 13, further comprising:
a first output temperature measuring unit disposed at where the cooling fluid storage tank is connected to the cooling flow channel;
a second output temperature measuring unit disposed at where the heating fluid storage tank is connected to the heating flow channel;
a first structure temperature measuring unit disposed on the first portion;
a second structure temperature measuring unit disposed on the second portion; and
a machine body temperature measuring unit disposed on the machine tool,
wherein the first output temperature measuring unit, the second output temperature measuring unit, the first structure temperature measuring unit, the second structure temperature measuring unit and the machine body temperature measuring unit are respectively connected to the computing unit.

15. The temperature regulation method of claim 14, wherein when a temperature measured by the machine body temperature measuring unit added by a first variable is greater than a temperature measured by the second output temperature measuring unit, the computing unit controls the first valve to switch the coolant to flow to a heat exchanger in the heating fluid storage tank to heat fluid in the heating fluid storage tank.

16. The temperature regulation method of claim 14, wherein when a temperature measured by the machine body temperature measuring unit added by a first variable is less than a temperature measured by the second output temperature measuring unit, the computing unit controls the first valve to switch the coolant to flow through the condenser and the expansion valve sequentially to a heat exchanger in the cooling fluid storage tank to cool fluid in the cooling fluid storage tank.

17. The temperature regulation method of claim 14, wherein when a temperature measured by the first structure temperature measuring unit is less than a temperature measured by the second structure temperature measuring unit, the computing unit controls the second valve to switch the cooling flow channel to be connected to the second portion and to switch the heating flow channel to be connected to the first portion.

18. The temperature regulation method of claim 17, wherein when a temperature measured by the machine body temperature measuring unit deducted by a second variable is less than a temperature measured by the first output temperature measuring unit, the computing unit controls the third valve to switch one of the first and second returning flow channels to flow from the first portion to the cooling fluid storage tank and to switch the other to flow from the second portion to the heating fluid storage tank.

19. The temperature regulation method of claim 17, wherein when a temperature measured by the machine body temperature measuring unit deducted by a second variable is greater than a temperature measured by the first output temperature measuring unit, the computing unit controls the third valve to switch one of the first and second returning flow channels to flow from the first portion to the heating fluid storage tank and to switch the other to flow from the second portion to the cooling fluid storage tank.

20. The temperature regulation method of claim 14, wherein when a temperature measured by the first structure temperature measuring unit is greater than a temperature measured by the second structure temperature measuring unit, the computing unit controls the second valve to switch the cooling flow channel to be connected to the first portion and to switch the heating flow channel to be connected to the second portion.

21. The temperature regulation method of claim 20, wherein when a temperature measured by the machine body temperature measuring unit deducted by a second variable is less than a temperature measured by the first output temperature measuring unit, the computing unit controls the third valve to switch one of the first and second returning flow channels to flow from the first portion to the heating fluid storage tank and to switch the other to flow from the second portion to the cooling fluid storage tank.

22. The temperature regulation method of claim 20, wherein when a temperature measured by the machine body temperature measuring unit deducted by a second variable is greater than a temperature measured by the first output temperature measuring unit, the computing unit controls the third valve to switch one of the first and second returning flow channels to flow from the first portion to the cooling fluid storage tank and to switch the other to flow from the second portion to the heating fluid storage tank.

23. The temperature regulation method of claim 13, further comprising a primary axis cooling circulation subsystem configured for cooling a primary axis of the machine tool, and comprising:
   a primary axis cooling flow channel connected from the cooling fluid storage tank to the primary axis of the machine tool; and
   a primary axis cooling returning flow channel connected from the primary axis to the heating fluid storage tank.

24. The temperature regulation method of claim 13, wherein the first valve, the second valve and the third valve are electromagnetic valves, and the computing unit is a computer or a programmable logic controller.

\* \* \* \* \*